United States Patent
Masuda et al.

(10) Patent No.: US 6,314,098 B1
(45) Date of Patent: Nov. 6, 2001

(54) ATM CONNECTIONLESS COMMUNICATION SYSTEM HAVING SESSION SUPERVISING AND CONNECTION SUPERVISING FUNCTIONS

(75) Inventors: Michio Masuda; Motoo Nishihara; Makoto Ogawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/075,843

(22) Filed: May 12, 1998

(30) Foreign Application Priority Data

May 12, 1997 (JP) .................................... 9-121072

(51) Int. Cl.[7] .................................................. H04L 12/56
(52) U.S. Cl. ............................................ 370/392; 370/474
(58) Field of Search ................................... 370/389, 392, 370/395–397, 400, 401, 409, 412, 465, 470, 471, 474

(56) References Cited

U.S. PATENT DOCUMENTS 6,137,798 * 10/2000 Nishihara et al. ................... 370/392

FOREIGN PATENT DOCUMENTS

| 4-369994 | 12/1992 | (JP) . |
| 5-56067 | 3/1993 | (JP) . |
| 6-30036 | 2/1994 | (JP) . |
| 6-62038 | 3/1994 | (JP) . |
| 7-74767 | 3/1995 | (JP) . |
| 07095199 | 4/1995 | (JP) . |
| 07202906 | 8/1995 | (JP) . |
| 7-264191 | 10/1995 | (JP) . |
| 09064915 | 3/1997 | (JP) . |
| 09083537 | 3/1997 | (JP) . |
| 10028143 | 1/1998 | (JP) . |

OTHER PUBLICATIONS

"A New Scheme of Connectionless Transmission over ATM", pp. 97–102; vol. 97, Nol. 131.
Cisco Systems, "Scaling The Internet With Tag Switching", *White Paper*, 1996, pp 1–7.
Cisco Systems and StrataCom, "Seamless Switching From The Campus To The WAN", *White Paper*, 1996, pp 1–6.

* cited by examiner

*Primary Examiner*—Wellington Chin
*Assistant Examiner*—Maikhanh Tran
(74) *Attorney, Agent, or Firm*—Foley & Lardner

(57) ABSTRACT

In an ATM connectionless communication system for delivering connectionless datagram in the form of sessions through an ATM network, each one of multiple edge units is connected to a user network where quality-of-service (QoS) sessions and No-QoS sessions are mixed. Each of the edge units accommodates an IPv4 packet from the user network into an intermediate frame and accommodates the intermediate frame into ATM cells. The edge units are connected to core units by permanent virtual paths to form a connectionless network. Each of the edge units has a session supervising section for determining whether the IPv4 packet is a QoS session or a No-QoS session, to allocate a control flow number to the IPv4 packet when the IP4 packet is a QoS session.

6 Claims, 14 Drawing Sheets

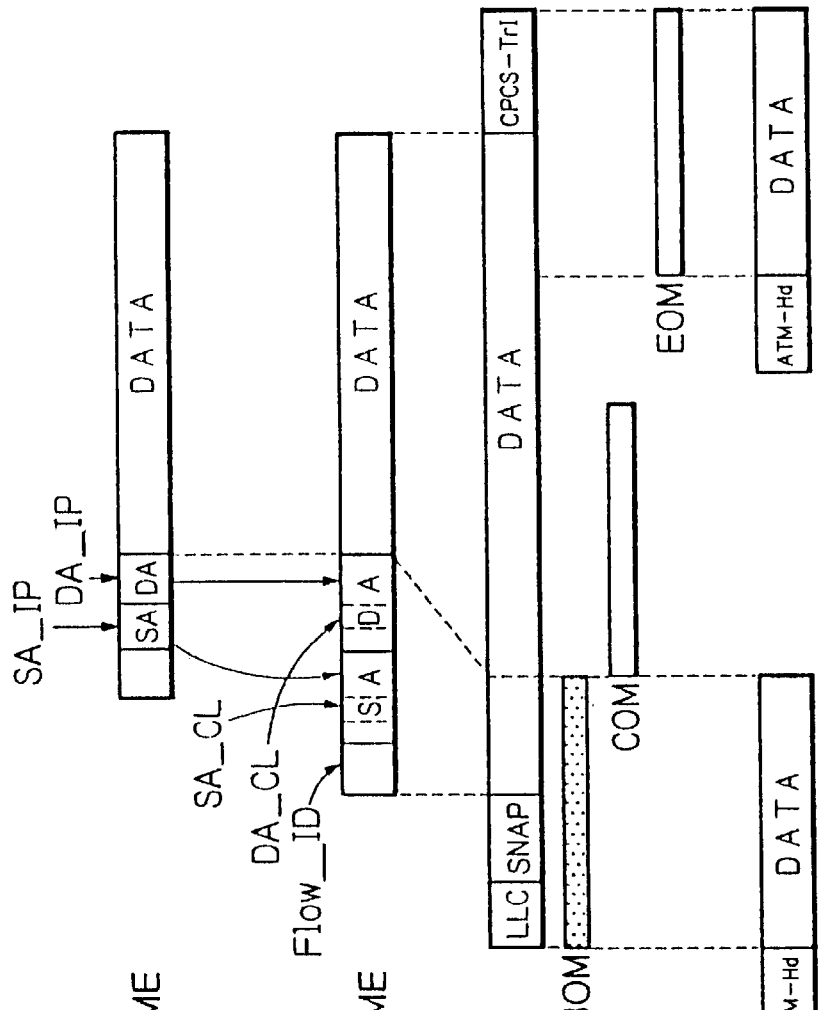
Fig. 3A  IPv4 FRAME
Fig. 3B  IPv6 FRAME
Fig. 3C  AAL5 CPCS-PDU FRAME
Fig. 3D  ATM CELLS

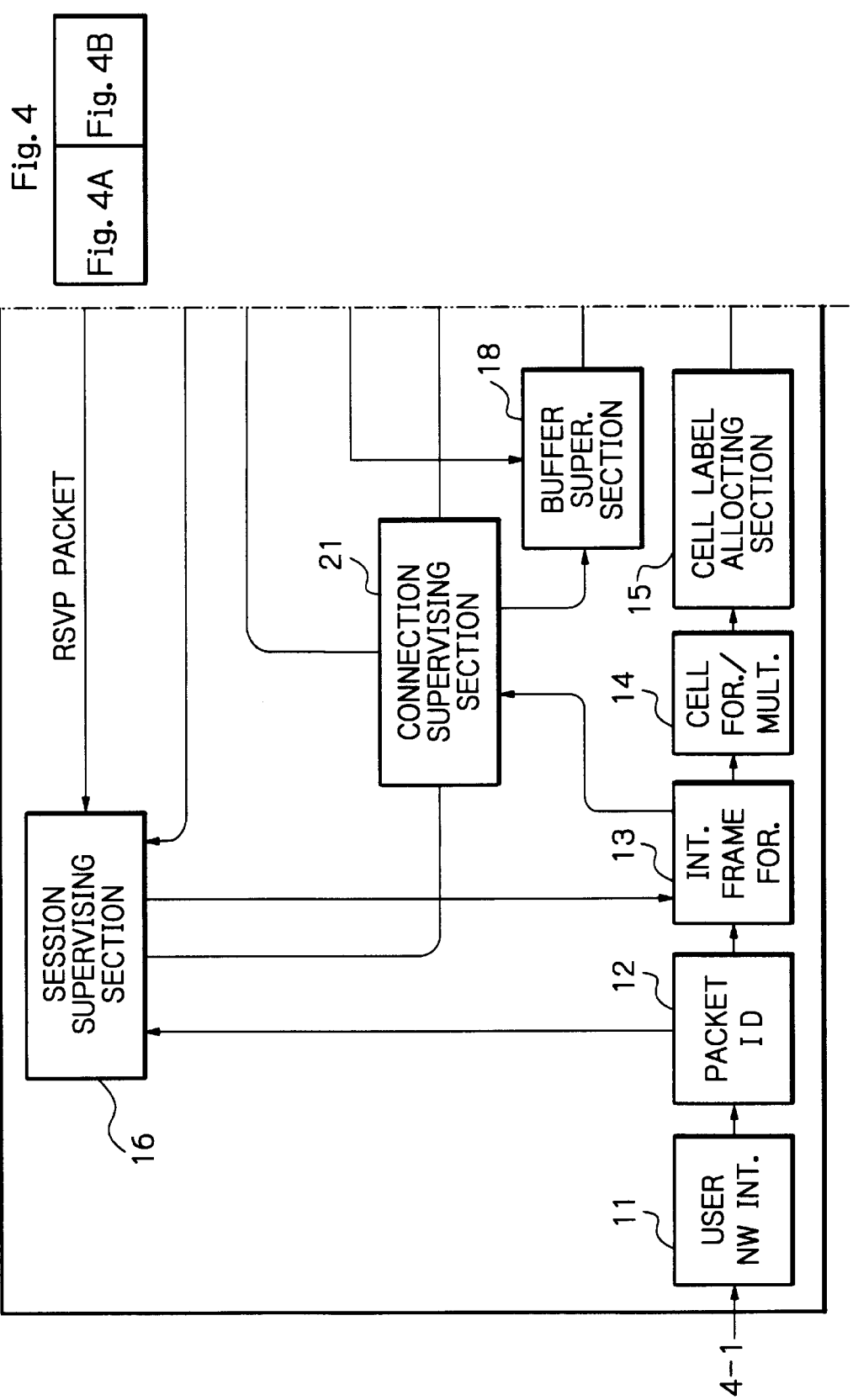

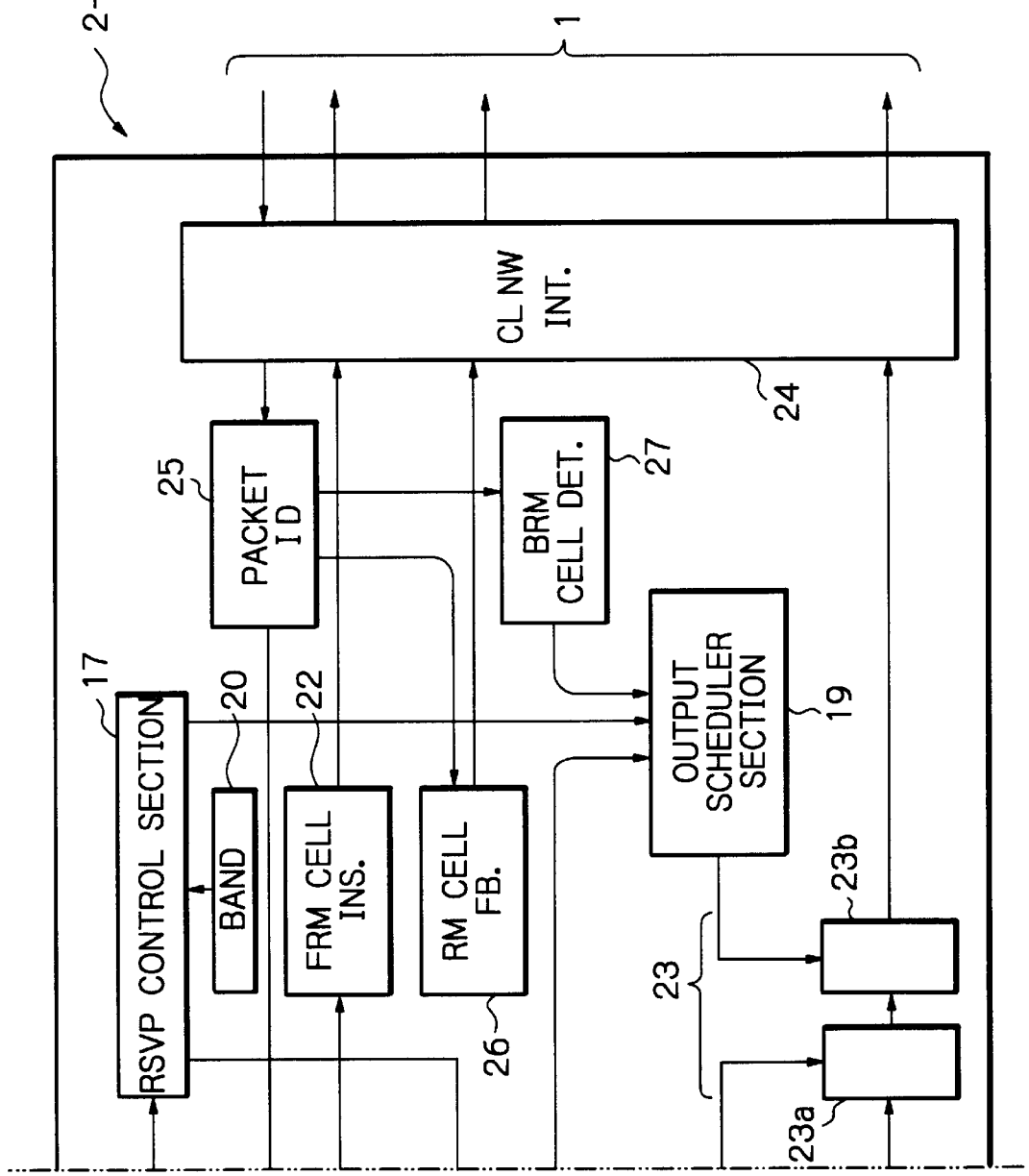

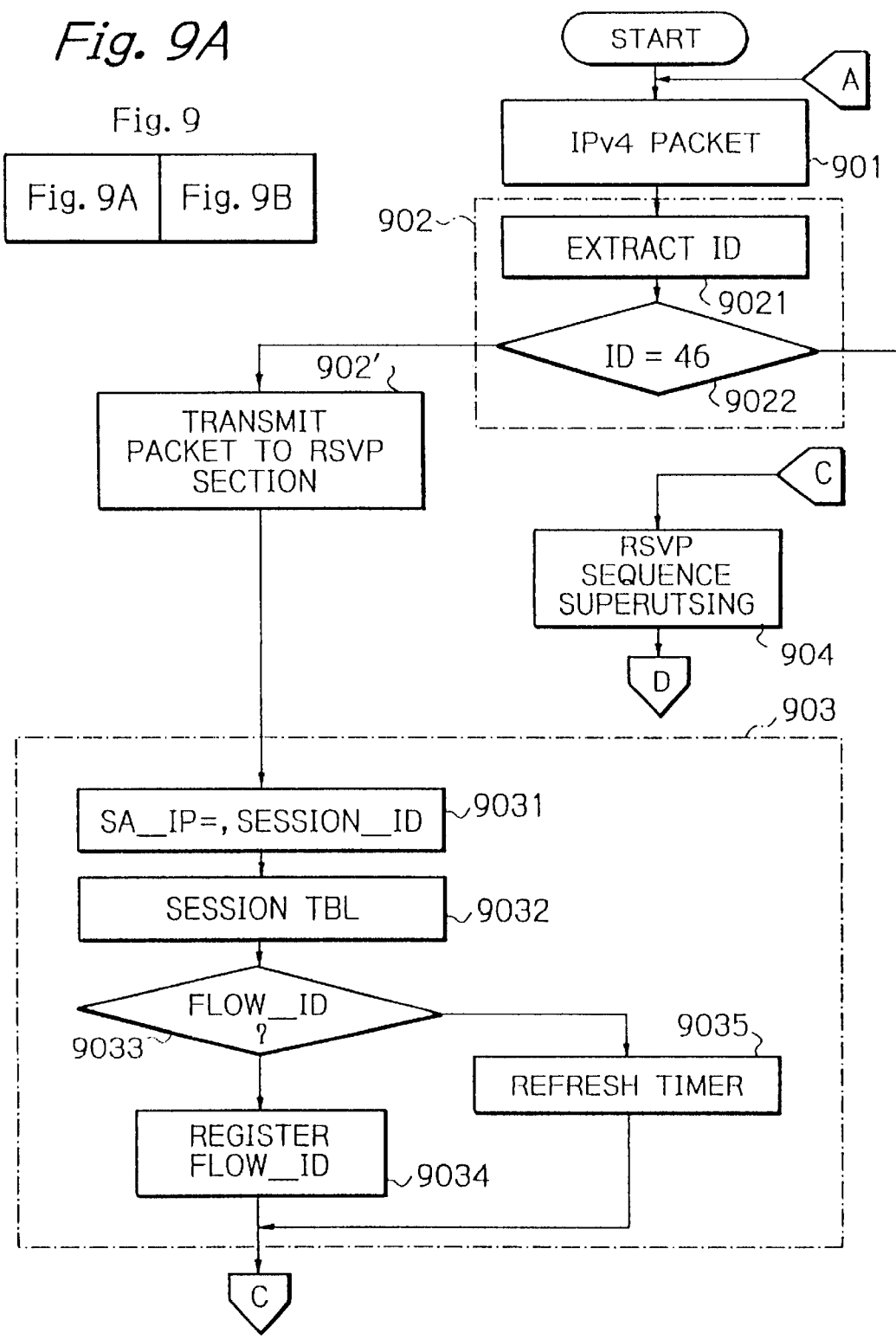

ATM CONNECTIONLESS COMMUNICATION SYSTEM HAVING SESSION SUPERVISING AND CONNECTION SUPERVISING FUNCTIONS

BACKGROUND OF THE INVENTION

1. Field of the Invention

The present invention relates to an asynchronous transfer mode (ATM) communication system, and more particularly, to an ATM connectionless communication system having a session supervising function and a connection supervising function.

2. Description of the Related Art

Recently, Internet protocol traffic is accommodated in an ATM network, and the traffic is processed at a high speed by layer 2 switching. In a standard ATM communication system, which is connection-oriented, however, an inter-user connection needs to be explicitly set before data is transmitted from a source user terminal to a destination user terminal. Therefore, a connection establishing process is independent of a data transmitting process. In the connection establishing process, a switched virtual connection (SVC) is carried out. That is, a connection supervising process is carried out by using a global connection identifier (GCID) and an ATM layer cell label including a virtual path identifier (VPI) and a virtual channel identifier (VCI), so that one VCI is allocated to each link between the user terminals.

A prior art ATM connectionless communication system is based on ITU-T Recommendation I. 364 (see JP-A-7-74767). That is, a server unit and user units are connected by a transmission line. Data cells on links are multiplexed to two-layer logical connections. This will be explained later in more detail.

In the prior art ATM connectionless communication network system, a packet managements depends upon a connection management, and both the managements are carried out by the AAL. Therefore, it is impossible to identify cells and reconstruct packets therefrom, and thus, it is difficult to realize a multicast service.

Also, in the prior art ATM connectionless communication network system, a multipoint-to-multipoint connection realizing procedure is not defined as an ATM standard. As a result, the complexity of the multipoint-to-multipoint connection realizing procedure as well as the allocation of ATM connection (VCI) and the load of informing VCI to the user equipments may delay data transfer.

Further, in the prior art ATM connectionless communication network system, however, since a processing load is concentrated on the server unit, the processing ability of the server unit is a bottleneck in the processing of the entire system. Additionally, if the server unit becomes in a fault state, the entire system may be in a fault state.

SUMMARY OF THE INVENTION

It is an object of the present invention to be able to carry out a multipoint-to-multipoint multicast communication in an ATM connectionless communication system.

According to the present invention, in an ATM connectionless communication system for delivering connectionless datagram in the form of sessions through an ATM network, each one of multiple edge units is connected to a user network where QoS sessions an No-QoS sessions are mixed. Each of the edge units accommodates an IPv4 packet from the user network into an Intermediate frame and accommodates the intermediate frame into ATM cells. The edge units are connected to core units by permanent virtual paths to form a connectionless network. Each of the edge units has a session supervising section for determining whether the IPv4 packet is a QoS session or a No-QoS session, to allocate a control flow number to the IPv4 packet when the IPv4 packet is a QoS session.

Also, a connection supervising section specifies the No-QoS sessions by source IP addresses and destination IP addresses and by aggregating the No-QoS sessions for every destination number of the edge units when the IPv4 packet is a No-QoS session.

BRIEF DESCRIPTION OF THE DRAWINGS

The present invention will be more clearly understood from the description as set forth below, with reference to accompanying drawings, wherein:

is FIGS. 3A, 3B, 3C and 3D are data formats showing an encapsulating process in the IWU of the system of FIG. 2;

FIGS. 4A and 4B are detailed block circuit diagrams of the IWU of FIG. 2;

FIGS. 9A, 9B, 10, 11 and 12 are flowcharts for explaining the operation of the IWU of FIG. 4.

DESCRIPTION OF THE PREFERRED EMBODIMENT

Before the description of the preferred embodiment, a prior art ATM connectionless communication network system will be explained with reference to FIG. 1 (see JP-A-7-74767).

Figure 1:
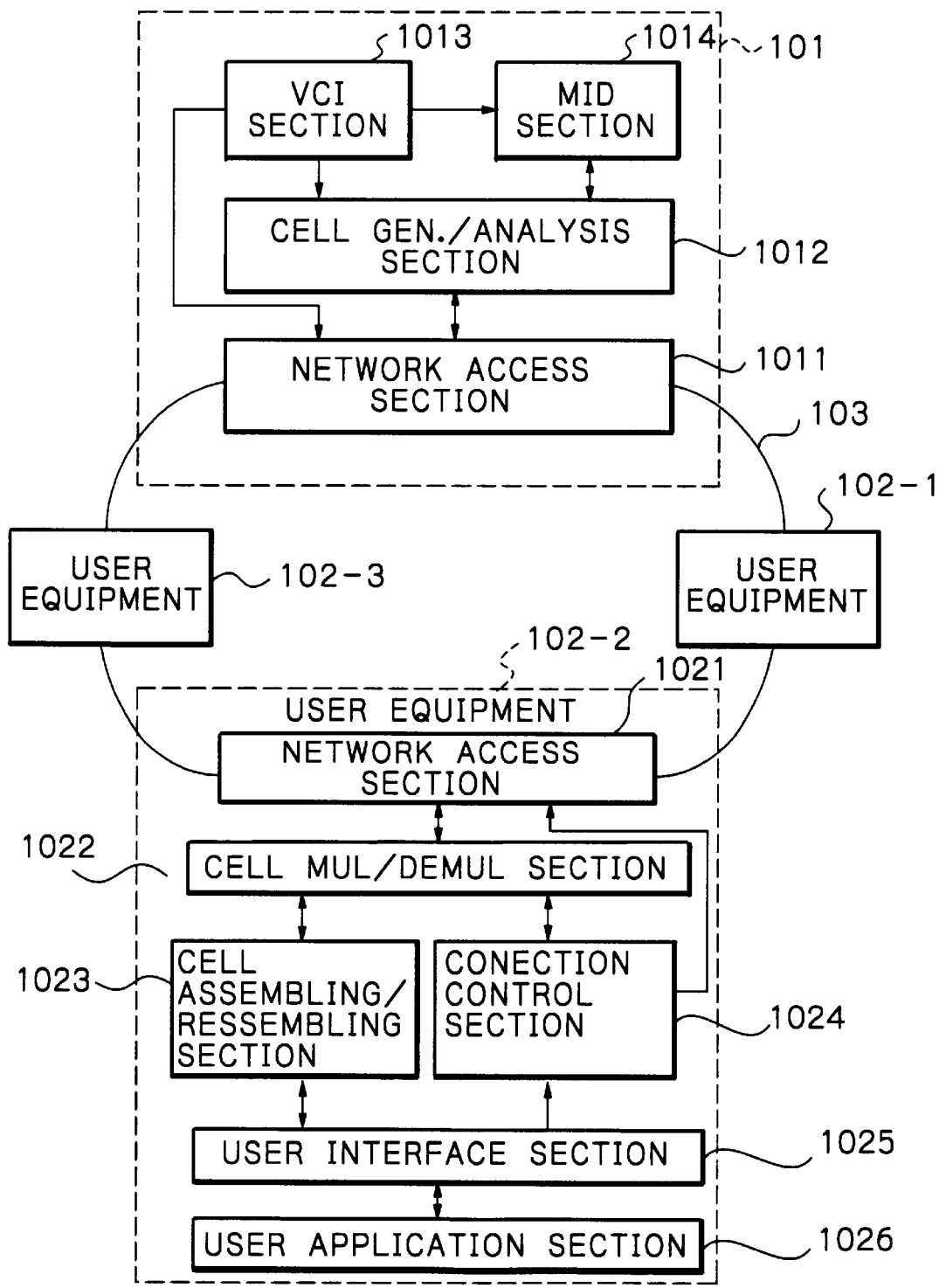
FIG. 1 is a block circuit diagram illustrating a prior art ATM connectionless communication network system.

In FIG. 1, which illustrates a network constructed by a server equipment 101 and user equipments 102-1, 102-2 and 102-3 connected by a transmission line 103, a cell as one data transmission unit is managed by multiplexing it on links to two-layer logical connections, i.e., a lower-layer connection and an upper-layer connection. In this case, the lower-layer connection is called a virtual channel (VC) or an ATM connection, and the upper-layer connection is called an ATM adaption layer (AAL) connection. The ATM connection uses a VCI as an identifier for determining a destination of an ATM cell level. When a cell as one transmission unit generated from a user equipment is divided into a plurality of cells on the VC, the AAL connection uses one multi-message identifier (MID) as an identifier for assembling the plurality of cells for each of the user equipments. Thus, user information is encapsulated by AAL Type ¾ having an MID field.

The server equipment 101 is constructed by a network access section 1011 for accessing the network, a cell generation/analysis section 1012 for generating cells and analyzing cells, a reception VCI initially-allocating section 1013, and an MID supervising section 1014. The reception VCI initially-allocating section 1013 initially-allocates one reception VCI value to each of the user equipments 102-1, 102-2 and 102-3, and transmits it to each of the user equipments 102-1, 102-2 and 102-3. The MID supervising section 1014 stores a correspondence between reception VCIs and MID values, thus supervising MID values used for each VC.

On the other hand, the user equipment such as 102-2 is constructed by a network access section 1021 for accessing the network, a cell multiplex-demultiplex section 1022 for multiplexing cells and demultiplexing cells, a cell assembling/disassembling section 1023 for assembling cells and dissembling cells, a connection control section 1024 for controlling a connection, a user interface 1025 for interfacing users, and a user application section 1026.

When a communication is carried out among the user equipments 102-1, 102-2 and 102-3, a connection control section 1024 of the user equipment such as 102-2 communicates with the MID supervising section 1012 of the server equipment 101, so that an unused MID value is retrieved by using a reception VCI value as a key. Therefore, the user equipment 102-2 that has received a selected MID value from the server equipment 101 establishes an AAL connection in accordance with the selected MID value, thus enabling a communication among the user equipments.

In the prior art ATM connectionless communication network system of FIG. 1, a packet management depends upon a connection management, and both the managements are carried out by the AAL. Note that multicast service of IP communication allows multipoint-to-multipoint communication where packets from multiple sources to the same destination are mixed on the same session. Also, a segmentation and reassembly sublayer (SAR) processing of AAL Type 5, which is the main current of IP over ATM system of an ATM Forum where IP packets are transferred on an ATM network, can manage packet by packet using an end of message (EOM) flag, while AAL Type ¾ having an MID field cannot manage packet by packet. However, the SAR processing does not have a field for responding to cell mixture in one connection from other packets. As a result, according to AAL Type 5, in a packet reassembling process at a receiving node, it is impossible to identify cells and reconstruct packets therefrom, and thus, it is difficult to realize a multicast service.

In spite of the above-mentioned situation, AAL Type 5 rather than AAL Type ¾ is used, because the latter requires a complex protocol to add a length indication (LI) and a cyclic redundancy check (CRC) to each cell to thereby carry out an error detection for each cell, which increases the installation cost. Actually, AAL Type 5 is used in an ATM-network interface card (NIC) mounted in a user customer system.

Also, in the prior art ATM connectionless communication network system of FIG. 1, a multipoint-to-multipoint connection realizing procedure is not defined as an ATM standard. As a result, the complexity of the multipoint-to-multipoint connection realizing procedure as well as the allocation of ATM connection (VCI) and the load of informing VCI to the user equipments may delay data transfer.

Further, generally, an MID resource is also wasted. That is, one MID is allocated in advance of each terminal belonging to a multicast group for carrying out multipoint-to-multipoint communication, to exclude cell mixture at network nodes. Thus, a bidirectional connection is realized. However, since the bit length of MIDs is a limited value such as 10, the number of communication available terminals within the multicast group is a limited value such as 1024 ($=2^{10}$). In the prior art ATM connectionless communication network system of FIG. 1, instead of allocating MIDs to the terminals, the server equipment 101 supervises vacant MID values. Then, a source terminal inquires about a vacant MID value to the server equipment 101 before data transmission, thus guaranteeing a unique MID value for each of packets transmitted simultaneously. In the prior art ATM connectionless communication network system of FIG. 1, however, since the processing load is concentrated on the server equipment 101, the processing ability of the server equipment 101 is a bottleneck in the processing of tile entire system. Additionally, if the server equipment 101 becomes in a fault state, the entire system may be in a fault state.

On the other hand, a resource reservation protocol (RSVP) has been developed as means for dynamically allocating bandwidth in an IP communication. That is, the RSVP has been standardized as an extension of the IP communication for reserving the entire IP network. However, there is a difference in basic system between the RSVP allowing a multipoint-to-multipoint session management and the ATM standard signalling (AAL Type 5 on VC) allowing only singlepoint-to-multipoint connection realizing means. In order to absorb this difference, a process is required for transforming a RSVP message to a lower layer signalling message, which is an obstacle in realizing a RSVP over an ATM system where RSVP packets are transferred in an ATM network.

Figure 2:
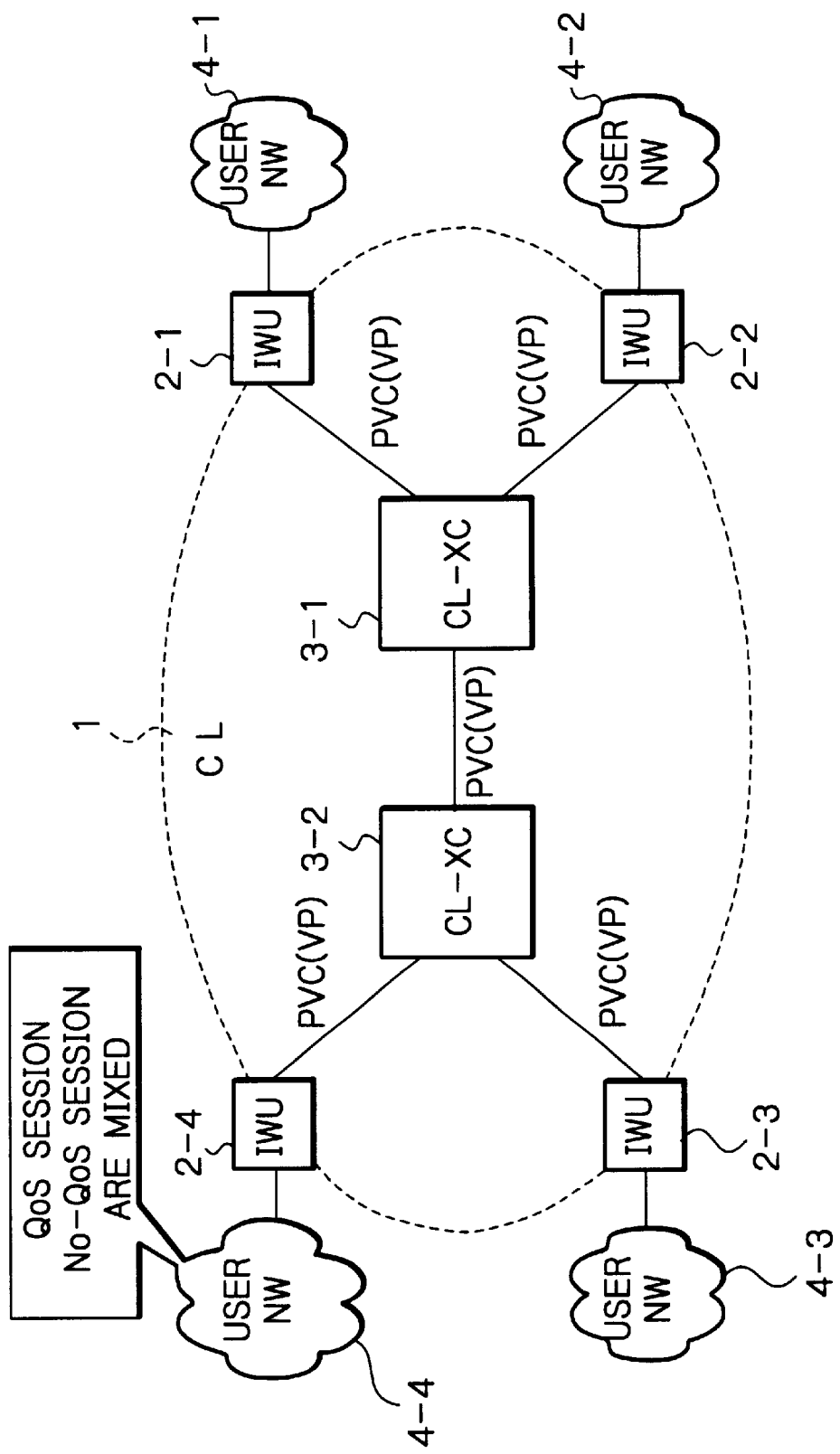
FIG. 2 is a block circuit diagram illustrating an embodiment of the ATM connectionless communication network system according to the present invention.

In FIG. 2, which illustrates an embodiment of the ATM connectionless communication system according to the present invention, reference numeral 1 designates a connectionless (CL) network including interconnection units 2-1, 2-2, . . . , and connectionless/crossconnect (CL-XC) units 3-1, 3-2, . . . connected to the interworking units (IWUs) 2-1, 2-2, . . . . Each of the IWUs 2-1, 2-2, . . . is an edge unit having a cell assembly/disambly (CLAD) function for assembling ATM cells and disassembling ATM cells and is connected to one of user networks 4-1, 4-2, . . . , which are local area networks (LANs) such as Ethernet. Each of the CL-XC units 3-1, 3-2, . . . is a core unit for carrying out a transit/transfer processing within the CL network 1.

The IWUs 2-1, 2-2, . . . and the CL-XC units 3-1, 3-2, . . . are connected by permanent virtual paths (PVPs).

A session supervising system according to the present invention is applied to the IWUs 2-1, 2-2, . . . and the CL-XC units 3-1, 3-2, . . . which exclude an ATM standard connection establishing process. Also, the user networks 4-1, 4-2, . . . allow an RSVP traffic and a best effort traffic mixed therein. Note that a RSVP traffic is a bandwidth guarantee traffic having a procedure for declaring a quality of service (QoS) in layer 3 or more and is called a QoS session. A best effort traffic is an IP traffic for terminals which do not have a bandwidth reservation procedure of RSVP and signalling and a QoS declaring procedure and is called a No-QoS session.

Each of the IWUs 2-1, 2-2, . . . determine whether or not there is a QoS declaring means at an end terminal, i.e., a traffic at the end terminal is a QoS session or a No-QoS session. As a result, for a QoS session, a control flow number "flow_ID" is allocated to each group which is also called "session" for receiving and passing a special data flow. The control flow number "flow_ID" is written in a predetermined field of an intermediate frame. For No-QoS sessions which do not have QoS declaring procedures and means for defining sources, traffics are aggregated on connections within the IWUs so that the same bidirectional path is supervised and flow is controlled.

An encapsulating process of the IWU such as 2-1 of FIG. 2 is explained next with reference to FIGS. 3A through 3D.

First, the IWU 2-1 receives an IPv4 frame as shown in FIG. 3A from the user equipment 4-1. In a header of FIG. 3A, "SA" is an IP address "SA_IP" of a source terminal, and "DA" is an IP address "DA_IP" of a destination terminal.

Next, the IWU 2-2 temporarily accommodates the IPv4 frame of FIG. 3A in an intermediate frame, i.e., a IPv6 frame as shown in FIG. 3B. In a header of FIG. 3B, "SA" includes a source IWU number "SA_CL" as well as the source IP address "SA_IP", and "DA" includes a destination IWU number "DA_CL" as well as the destination IP address "DA_IP". Also, "Flow_ID" is a flow number for identifying a session. The header of the IPv6 frame is used as transmission information within the CL network 1.

Next, a header formed by "LLC" and "SNAP" and a trailer "CPCS-Tri" of AAL Type 5 are added to the IPv6 frame of FIG. 3B, to form a common part convergence sublayer-protocol data unit (CPCS-PDU) frame, as shown in FIG. 3c.

Finally, the CPCS-PDU frame of FIG. 3C is accommodated by an SAR processing of AAL in ATM cells as shown in FIG. 3D. In this case, the VCI is given to all the ATM cells, and the ATM cells are sequentially transmitted to the CL network 1. Note that, since the header of the IPv6 frame is usually 40 bytes, the header of the IPv6 frame is entirely accommodated in a leading ATM cell, i.e., a BOM cell.

In FIG. 4, which is a detailed block circuit diagram of the IWU such as 2-1 of FIG. 2, reference numeral 11 designates a user network (LAN) interface with the user network 4-1 for receiving packets from the user network 4-1 and transmitting packets to the user network 4-1. The user network interface 11 is connected to a packet identification section 12.

The packet identification section 12 is connected to an intermediate frame forming section 13, a cell forming/multiplexing section 14 and a cell label allocating section 15. Also, the packet identification section 12 is connected to a session supervising section 16 and an RSVP control section 17.

The packet identification section 12 determines whether a received packet as shown in FIG. 3A is an RSVP control packet or a main signal data packet in accordance with the header information of the received packet.

In the packet identification section 12, if the received packet is determined to be an RSVP control packet, the packet identification section 12 transmits the RSVP control packet via the session supervising section 16 to the RSVP control section 17. In this case, upon receipt of the RSVP control packet, the session supervising section 16 registers "flow_ID" in a table as keys to the source IP address "SA_CL" and the session number of the RSVP control packet. Then, the RSVP control packet is transmitted to the RSVP control section 17. The RSVP control section 17 interprets QoS information as service designation request information to set resource parameters in a buffer supervising section 18 and an output scheduler 19. Note that a band supervising section 20 is connected to the RSVP control circuit 17.

On the other hand, in the packet identification section 12, if the received packet is determined to be a main signal data packet, the table in the session supervising section 16 is retrieved to determine whether or not the main signal data packet belongs to a QoS session by the RSVP. As a result of this table retrieval, if a registered entry of the table is hit, so that the main signal data packet is determined to be a QoS session, the session supervising section 16 reads "flow_ID" corresponding to the source IP address and the session number of the main signal data packet from the table and transmits it to the intermediate frame forming section 13. In the intermediate frame section 13, the "flow_ID" as well as the source IWU number "SA_CL" and the destination IWU number "DA_CL" are accommodated in the header of an intermediate frame as shown in, FIG. 3B.

Also, ma a result of the above-mentioned table retrieval, if the registered entries of the table are mishit, so that the main signal data packet is determined to be a No-QoS (non-band reservation) session, the session supervising section 16 transmits a "flow_ID" such as all zeroes indicating a best effort traffic to the intermediate frame forming section 13. Then, the intermediate frame forming section 13 accommodates the obtained "flow_ID" in the header of an intermediate frame. After that, the intermediate frame forming section 13 transmits inter-terminal connections concentrated for every destination IWU to a connection supervising section 21. The connection supervising section 21 registers inter-terminal connections in relation to destination IWU in a connection supervising table. The connection supervising table is soft-stately supervised, i.e., arrival of cells belonging to each destination IWU connection is supervised by using a clean-up timer, and only active connections are maintained.

The connection supervising section 21 is connected to a forward resource management (FRM) cell insertion section 22. When the connections are active, the connection supervising section 21 transmits an FRM cell insertion instruction to the FRM cell insertion section 22, so that FRM cells are transmitted to the CL network 1, thus monitoring a congestion state of the CL network 1.

The main signal data packet obtaining the "flow _ID" is accommodated in ATM cells and is multiplexed in the cell forming/multiplexing section 14. Then, a VCI is allocated to the ATM cells of each packet in the cell label allocating section 15, and then, the ATM cells are stored in a queue 23a of a cell buffer 23 which also includes a scheduler 23b.

If traffics are QoS sessions, the buffer supervising section 18 supervises the queue 23a for every QoS session. On the other hand, if traffics are no QoS sessions, the buffer supervising section 18 supervises the queue 23a for every destination IWU. The read operation of the scheduler 23b is controlled by the output scheduler section 19 in accordance with an output band speed, so that cells within the cell buffer 23 are transmitted via a CL network interface 24 to the CL network 1.

Also, a packet identification section 25 identifies a packet received from the CL network 1. The packet identification section 25 is connected to an RM cell feedback section 26 and a backward RM (BRM) cell detection section 27. RM cells are fed back at the RM cell feedback section 26 and are again transmitted via the CL network interface 24 to the CL network 1.

Figure 5:
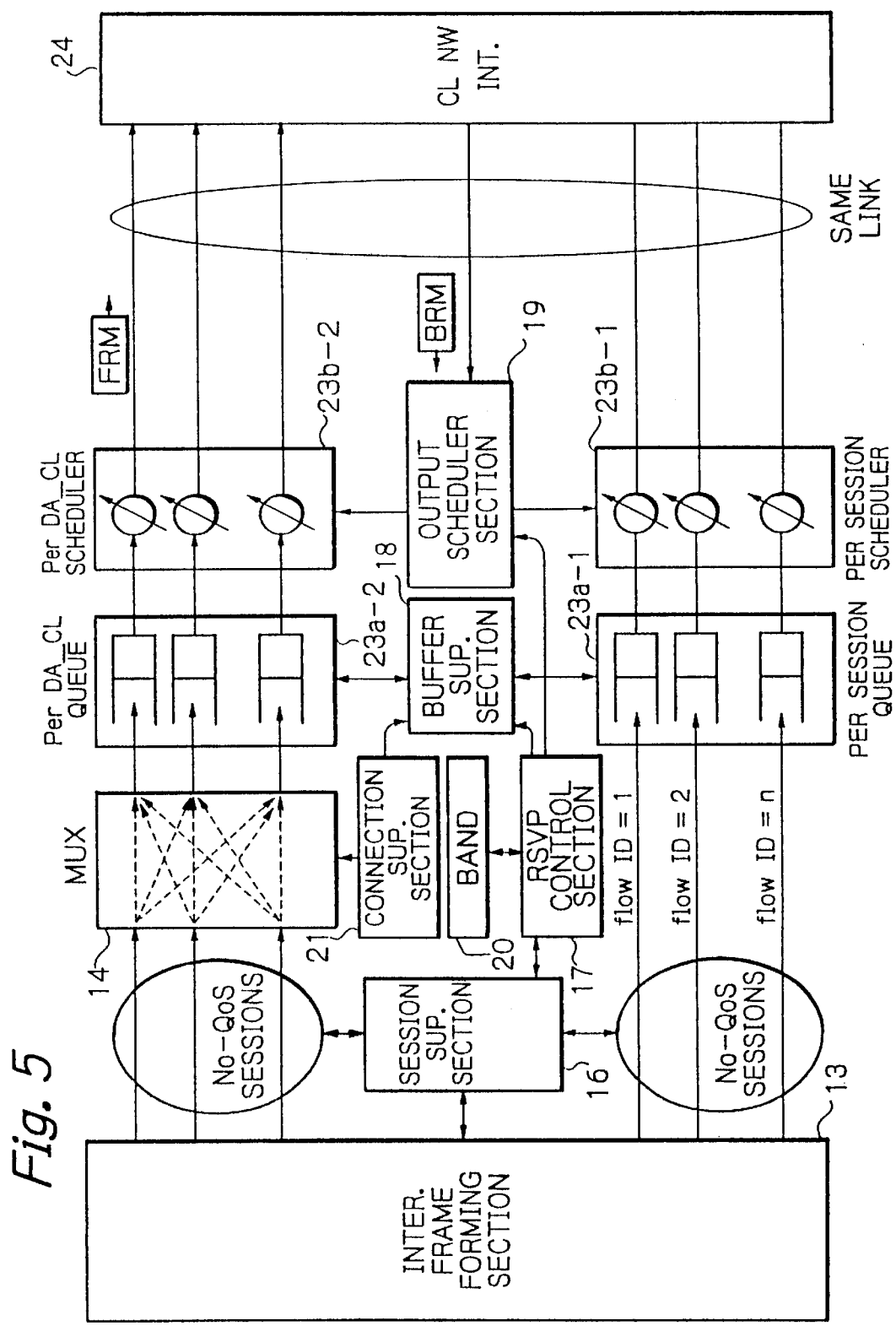
FIG. 5 is a circuit block circuit diagram of a principal portion of the IWU of FIG. 4.

The data flow of the IWU of FIG. 4 is explained next in more detail with reference to FIG. 5 which is a principal portion of the IWU. As explained above, there are QoS sessions and No-QoS sessions in the CL network 1. In FIG. 5, the queue 23a is divided into a queue 23a-1 for Qos sessions and a queue 23a-2 for No-QoS sessions, and the scheduler 23b is divided into a scheduler 23b-1 for Qos sessions and a scheduler 23b-2 for No-QoS sessions.

First, the method for accommodating QoS sessions is explained.

In a QoS session, in order to set a data flow required as a special quality of service, use is made of a band reservation request accommodated in an RSVP control packet. That is, this band reservation request is transmitted from the RSVP control section 17 to the band supervising section 20 which determines whether or not the band reservation request is to be allowed. After the band reservation request is allowed by Like band supervising section 20, the RSVP control section 17 causes the session supervising section 16 to register "flow_ID" in correspondence with the destination IP address "SA_IP" and the session number. Then, the RSVP control section 17 causes the buffer supervising section 18 to set filtering parameters therein required for a writing processing of the queue 23a-1. Also, the RSVP control section 17 causes the output scheduler section 19 to set resource control parameters therein required for a reading processing of the scheduler 23b-1. The "flow_ID" is also transmitted to the intermediate frame forming section 13.

Thus, when data packets belonging to QoS sessions arrive in IWUs, the data packets are classified by the session supervising section 16 for sessions to which the data packets belong. That is, the data packets are transmitted from the intermediate frame forming section 13 via the queue 23a-1 and the scheduler 23b-1 and the CL network interface 24 to the CL network 1 in accordance with the resource control parameters set in the output scheduler section 19.

Identification information "flow_ID" of the data packets belong to QoS sessions are supervised by a soft-state management. That is, the session supervising section 16 incorporates a clean-up timer to count a time for deleting a soft state. In other words, the soft-state "flow_ID" is refreshed by detecting a data flow therethrough; in this case, if the "flow_ID" has not been refreshed for a clean-up time period, the soft-state of "flow_ID" is reset.

In order to emulate the QoS sessions in the CL network 1, the RSVP control section 17 has the following functions:

① a function for translating QoS information (service designation request) transmitted from user terminals into Qos information for supporting the former in the CL network 1;

② a function for periodically checking transfer paths of RSVP packets, i.e., for emulating path messages and reverse messages defined by RSVP; and ③ a function for maintaining different QoSs for every receiving user terminal.

Next, the method for accommodating No-QoS sessions is explained.

Upon receipt of a data packet, flow number "flow _ID" is retrieved from the table of the session supervising section 16 by using the source ID address "SA_IP" and the session number "Session_ID". In this case, there is such a flow number "flow_ID" In the entries of the table, and the data packet is determined to belong to No-QoS sessions. As a result, the intermediate frame forming section 13 forms an intermediate frame having a flow number "flow$_{\_ID}$" (="0 . . . 0"). Then, the connection supervising section 21 controls the multiplexer of the cell forming/multiplexing section 14, so that a connection between end terminals represented by "SA_IP" and "DA_IP" is multiplexed to a connection between the IWUs represented by "SA_CL" and "DA_CL". The multiplexed connection is stored in the queue 23a-1. Note that the queue 23a-1 is classified for the IWUs and is constructed by a large amount of buffer memories which are supervised by the buffer supervising section 18.

Also, the scheduler 23b-2 per destination IWU is connected to the buffer memories.

The inter-IWU connection is supervised by the connection supervising section 18 including a table having destination CL addresses as entries. Also, inter-IWU connections are supervised by a soft-state management. That is, the connection supervising section 18 incorporates a clean-up timer to count a time for deleting a soft state. In other words, when the clean-up timer is up, if an inter-IWU connection does not have any traffic, such an inter-IWU connection is deleted from the table. On the other hand, if a packet having a new destination CL address is received, an inter-IWU connection identification is registered in the table of the connection supervising section 18.

Note that the CL-XC units 3-1 and 3-2 of FIG. 2 supervise only active connections in accordance with source IWU addresses "SA_CL" and destination IWU addresses "DA_CL" accommodated in BOM cells or FRM cells.

In order to respond to the reduction of throughput by the scrapping of cells in a high load, the CL network 1 has a function of flow control on a basis of cell rate. That is, the FRM cell insertion section 22 periodically inserts forward FRM (FRM) cells into only active connections. Then, traffic passing through congested links is absorbed at the IWU by the feedback control of the RM cells, thus carrying out a flow control by the rate regulation and the output scheduling of cells. As a result, the cell rate within the CL network 1 is controlled by the feedback control for every destination IWU, so that the cell rate within the CL network. 1 is brought between a minimum cell rate (MCR) and a peak cell rate (PCR).

Figure 6:
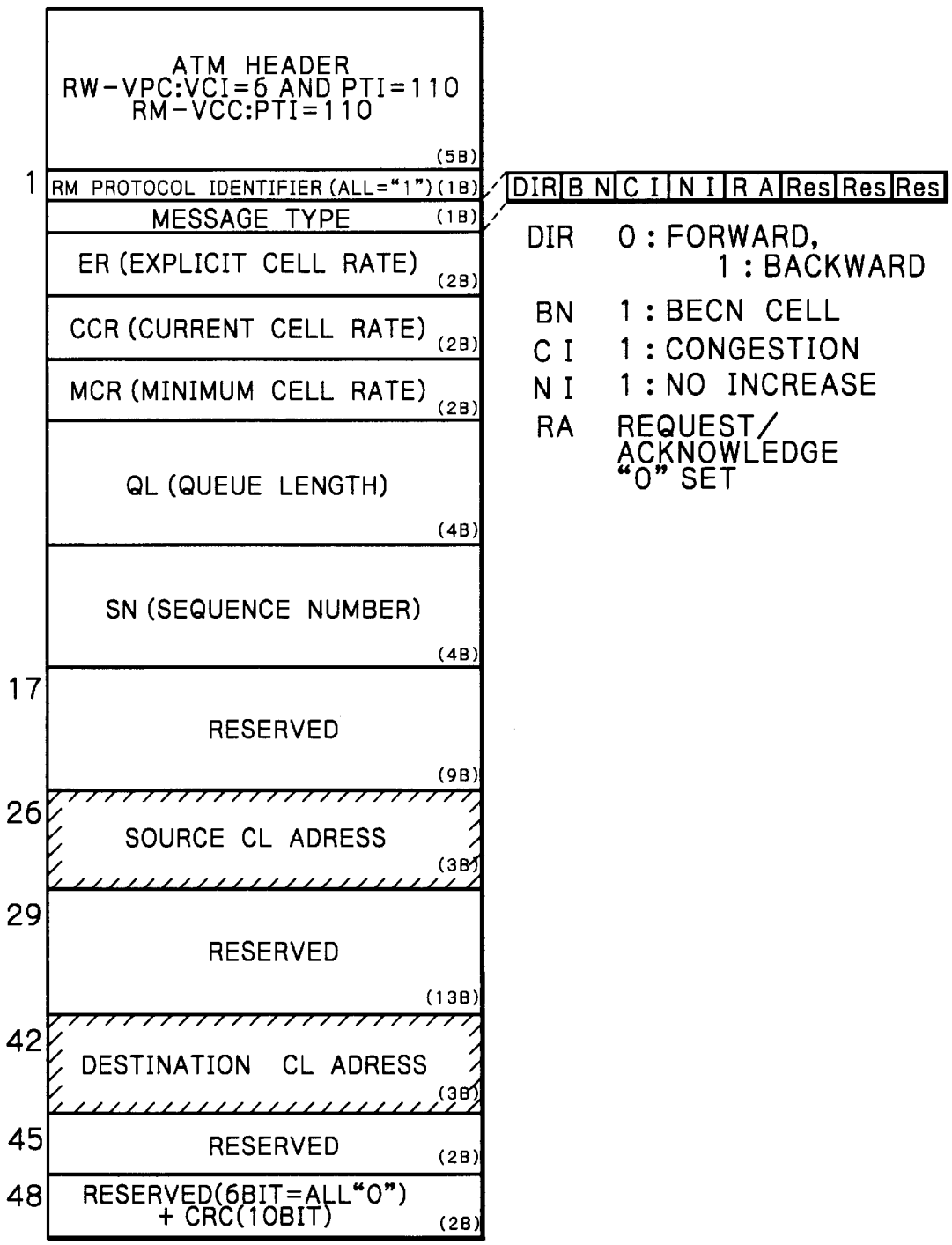
FIG. 6 is a format of one RM cell used in the system of FIG. 2.

In FIG. 6, which is a format of one RM cell applied to the present invention (see The ATM Forum Technical Committee; "Traffic Management Specification Version 4.0", March 1996), this format is common to the FRM cells and the BRM cells. When a main signal data packet of AAL Type 5 is accommodated in cells, an IWU address "SA_CL" and a destination IWU address "DA_CL" are accommodated in a BOM cell. More particularly, the source IWU address "SA_CL" is set in the 26-th byte to the 28-th byte of a payload, and the destination IWU address "DA_CL" is set in the 42-nd byte to the 44-th byte of the payload. Also, a direction (DIR) bit indicates an FRM cell (="0") and a BRM cell (="1"). The DIR bit is changed when turned around by the destination IWU.

Figure 7:
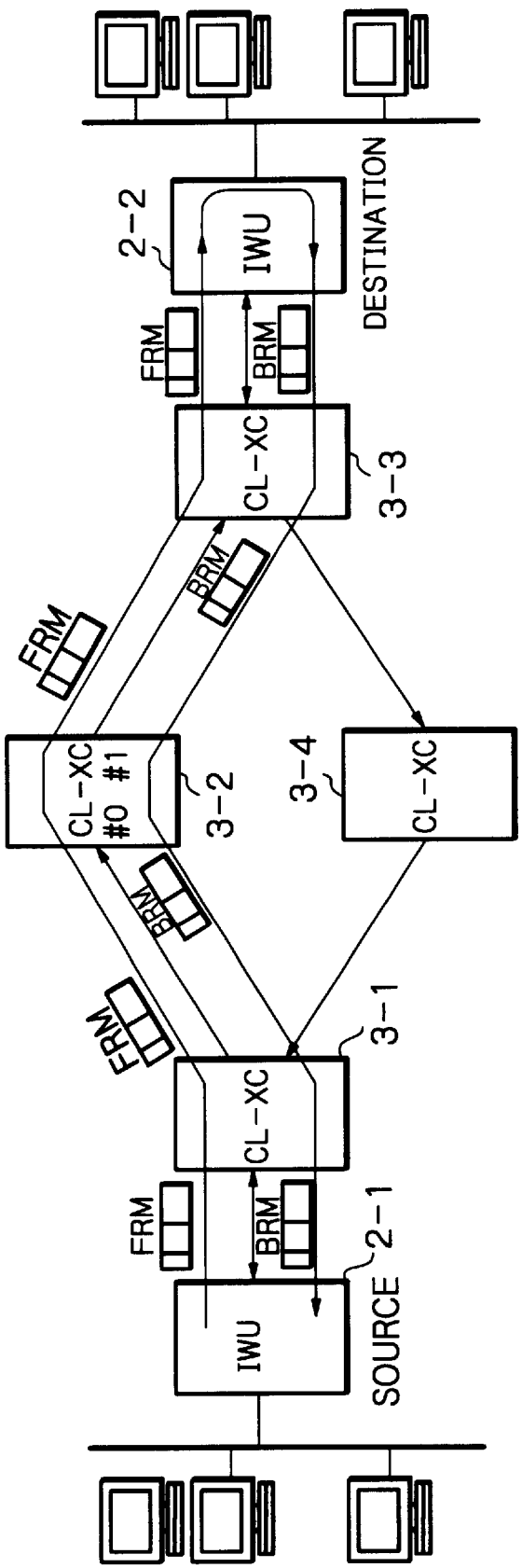
FIG. 7 is a circuit diagram for explaining the operation of the system of FIG. 2.

The operation of the system of FIG. 2 is explained next with reference to FIG. 7. In FIG. 7, two main signal cell transfer paths are set between the source IWU 2-1 and the destination IWU 2-2. Here, assume that a forward main signal cell transfer path flows from the source IWU 2-1 via the CL-XC units 3-1, 3-2 and 3-3 to the destination IWU 2-2, and a backward main signal cell transfer path flows from the destination IWU 2-2 via the CL-XC units 3-3, 3-4 and 3-1 to the source IWU 2-1.

The source IWU 2-1 supervises active connections for every destination IWU. The source IWU address "SA_CL" and the destination IWU address "DA_CL" are accommodated in a predetermined field of a BOM cell and the payload of FRM cells which are transmitted as a data flow to the CL-XC units 3-1, 3-2 and 3-3.

In each of the CL-XC units 3-1, 3-2 and 3-3, an input port number and an output port number of the data flow are registered in an active connection table as keys of the source IWU address "SA_CL" and the destination IWU address "DA_CL" accommodated in the BOM cell and the FRM cells. The active connection table is maintained by monitoring the same FRM cells using a clean-up timer. Therefore, BRM cells can be turned around at the destination IWU 2-1 without using an explicit connection realizing means by ATM standard signalling or the like.

The above-mentioned operation is explained next in more detail.

The source IWU 2-1 transmits an FRM cell for every destination IWU address "DA_CL", and supervises active connections by soft-state means. In this case, the source IWU address "SA_CL" and the destination IWU address "DA_CL" are accommodated in a BOM cell and FRM cells.

When the CL-XC unit 3-1, 3-2 or 3-3 receives the FRM cells, each of the CL-XC units 3-1, 3-2 and 3-3 maintains the input port number and the output port number corresponding to the source IWU address "SA_CL" and the destination IWU address "DA_CL" in an active connection supervising table by using a clean-up timer. This table is used when feeding back RM cells (BRM cells). The source IWU address "SA_CL" and the destination IWU address "DA_CL" unambiguously correspond to a connection number defined by only the CL-XC units 3-1, 3-2 and 3-3, and are translated to keys of a rate base control for supervising buffers as VC units in a standard ATM network. In addition, in each of the CL-XC units 3-1, 3-2 and 3-3, a buffer congestion state and rate information are written as an explicit cell rate ER and a current cell rate (CCR) into the FRM cells which then are transmitted to the destination IWU 2-2.

The FRM cells turn around the destination IWU 2-2 as BRM cells by reversing the DIR bits thereof.

In each of the CL-XC units 3-3, 3-2 and 3-1 which receive the BRM cells, the backward output port number, i.e., the forward input port number is obtained by referring to the connection correspondence supervising table using the source IWU address "SA_CL", the destination IWU address "DA_CL" and the backward input port number. Then, the current congestion state is written into the BRM cells, which then is transmitted to the source IWU 2-1.

Finally, when the source IWU 2-1 receives the BRM cells, the IWU 2-1 carries out a rate control and scheduling for each of the destination IWUs in accordance with the rate information and the congestion state included in the BRM cells as well as the buffer state of the IWU 2-1.

Figure 8:
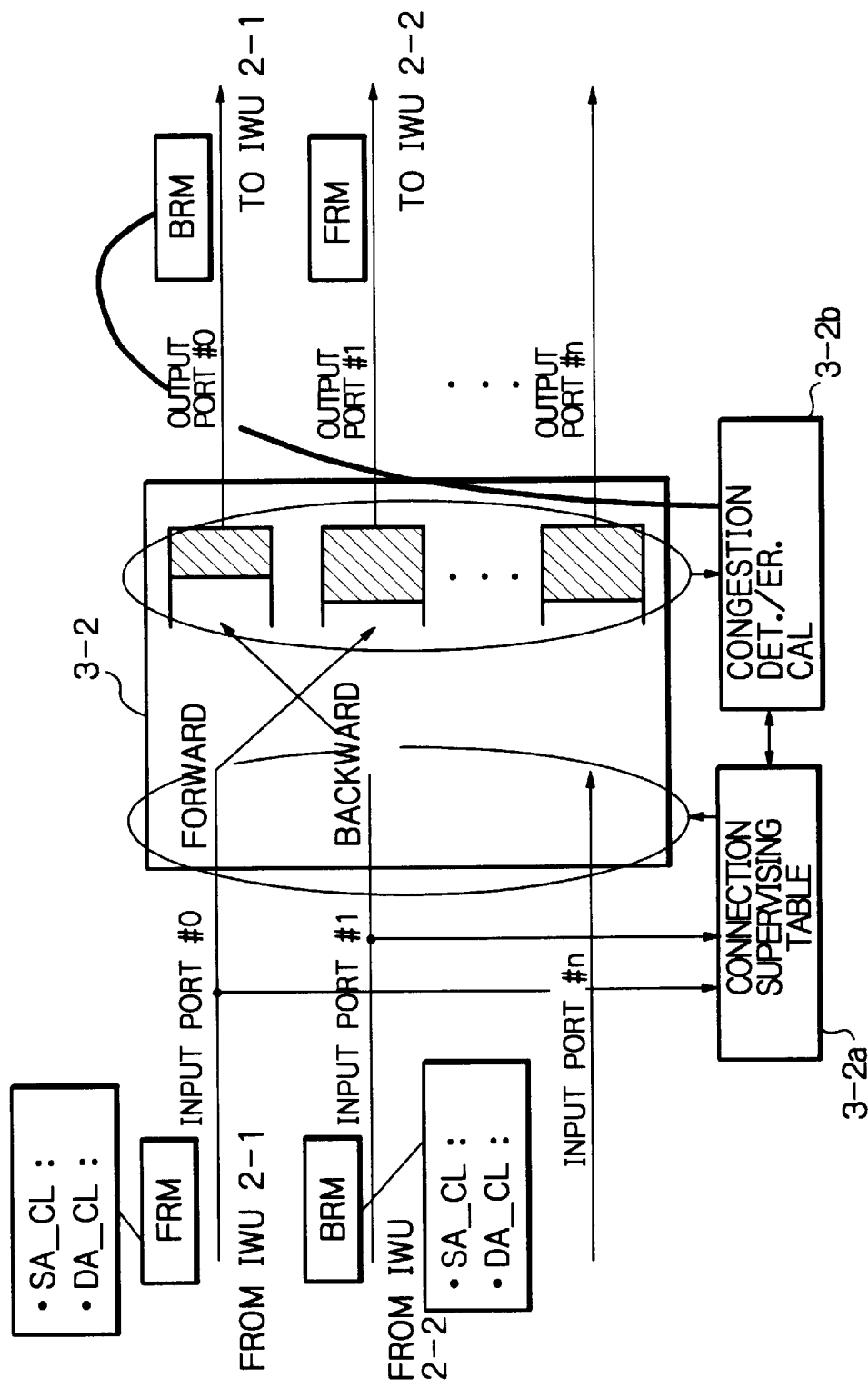
FIG. 8 is a detailed circuit diagram of the CL-XC unit of FIG. 7.

In FIG. 3, which is a detailed circuit diagram of the CL-XC 3-2 of FIG. 7, the CL-XC 3-2 has input ports #0, #1, ..., and output ports #0, #1, ... corresponding to the input ports #0, #1, ..., respectively. In FIG. 8, when the CL-XC 3-2 receives an FRM cell at the input port #0 from the IWU 2-1, the CL-XC 3-2 obtains the output port #1 as a key of the destination IWU address "DA_CL" by referring to a switching table. Then, the FRM cell is transmitted from the output port #1 Simultaneously, the CL-XC 3-2 stores the source IWU address "SA_CL" and the input port #0 in a connection supervising table 3-2a, in order to receive a BRM cell.

Next, the CL-XC 3-2 receives the BRM cell from the IWU 2-2 at the input port #1 whose number is the same as the output port #1 of the FRM cell. As a result, the CL-XC 3-2 obtains the output port #0 by referring to the connection supervising table 3-2a using the source IWU address "SA_CL", the destination IWU address "DA_CL" and the output port #1. In other words, in the CL-XC unit 3-2, the FRM cell is input to the input port #0 and output from the output port #1, while the BRM cell is input to the input port #1 and output from the output port #0. Thus, the input port number and output port number of the BRM cell are the same as the output port number and input port number of the FRM cell, respectively. Therefore, the transfer path of the BRM cell is opposite to that of the FRM cell. Note that a calculating circuit 3-2b writes a congestion state of the output port #1 into the BRM cell, and writes an ER value into the BRM cell only when a calculated explicit cell rate (ER) value is smaller than the ER value included the BRM cell.

The session supervising operation of the IWU of FIG. 4 is explained next with reference to FIGS. 9, 10, 11 and 12.

Figure 9B:
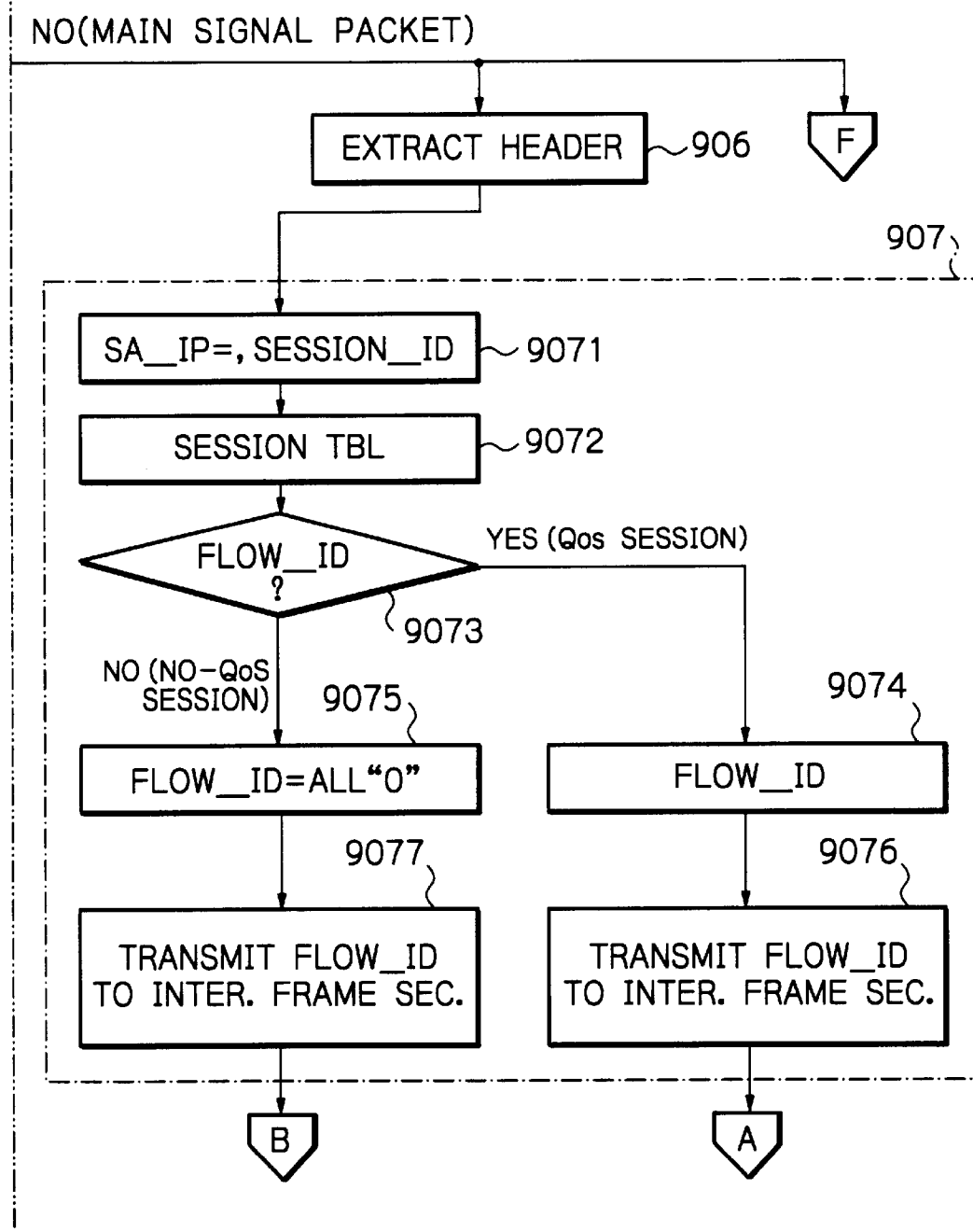

First, at step 901 of FIG. 9, an IPv4 packet from the user network 4-1 is received by the user network interface 11. Then, the control proceeds to step 902.

At step 902, the packet identification section 12 determines whether or not the IPv4 is an RSVP packet. Note that an RSVP packet is defined by an IP datagram of protocol number 46 (OX2E). Therefore, the packet identification section extracts a protocol field ID (8 bits) within an IP header (see 9021), and then the packet identification section determines whether or not the protocol field ID is 46 (see 9022). As a result, if the IPv4 packet is an RSVP packet, the control proceeds to step 902. On the other hand, if the IPv4 packet is a main signal packet, the control proceeds to step 906.

At step 902', the RSVP packet is transmitted to the RSVP control section 17. Then, at step 903, a registering processing step 903 is carried out. That is, "SA_IP" and "session_ID" are extracted (see 9031), and a session table is retrieved by using the "SA_IP" and "session_ID" as keys. Then, it is determined whether or not "flow_ID" is included in the session table (see 9033). As a result, if "flow_ID" is not registered in the session table, a new "flow_ID" as well as the "SA_IP" and "session_ID" are registered in the session table (see 9034). On the other hand, if "flow_ID" is already registered in the session table, a clean-up timer is refreshed (see 9035).

Next, at step 904, the kind of an RSVP message is determined by reading a message type field (8 bits) within a common header of the RSVP control packet, and a protocol processing and a sequence supervising are carried out in accordance with the kind of the RSVP message.

Figure 10:
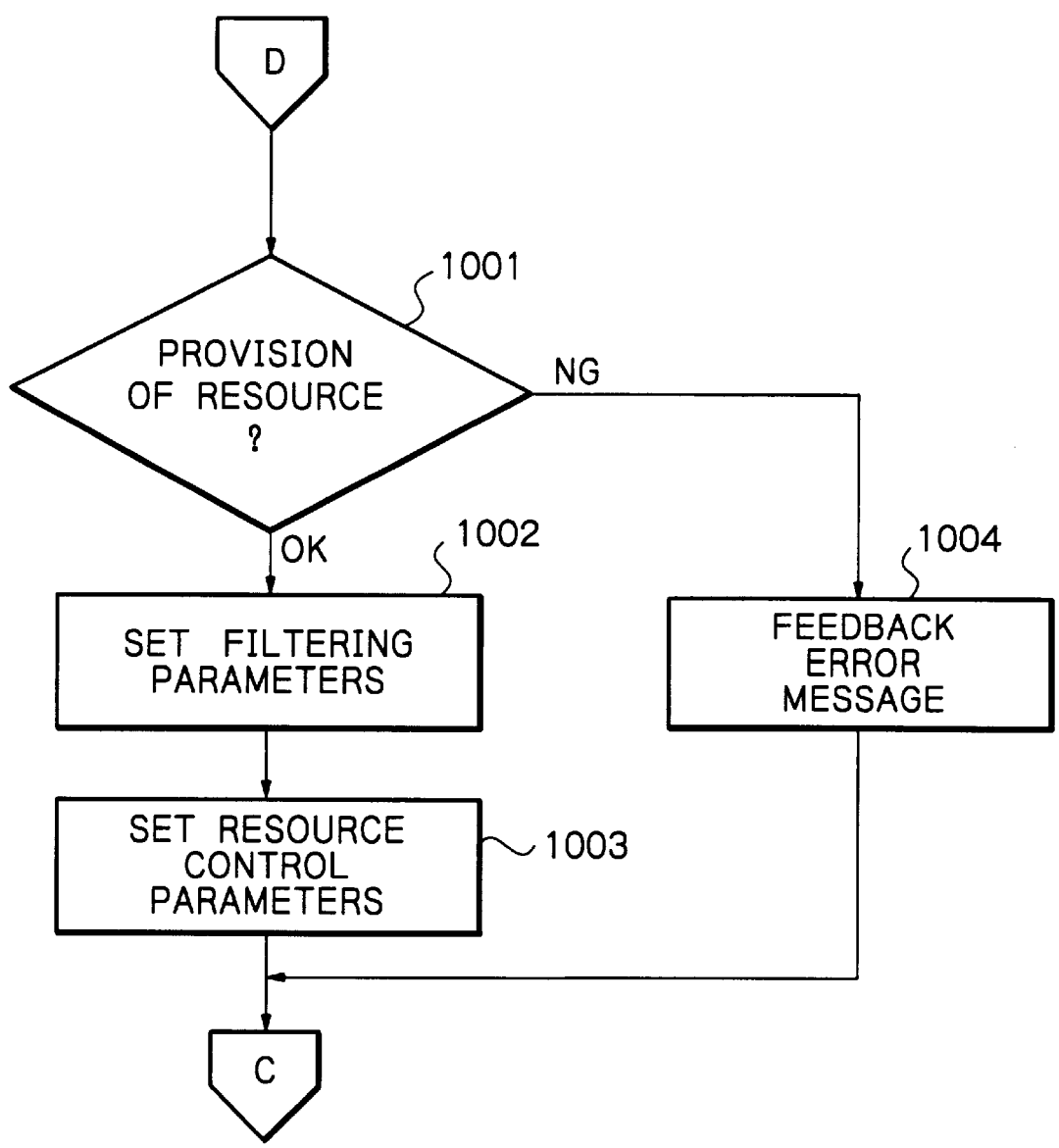

If the RSVP control section 17 receives a reservation message, the reservation message is transmitted to the band supervising section 20 which carries out an operation as shown in FIG. 10. The band supervising section 20 determines whether or not provision of resource can be allowed (see 1001). If allowed, the RSVP control section 17 sets filtering parameters in the buffer supervising section 18 (see 1002), and sets resource control parameters in the output scheduler section 19 (see 1003). On the other hand, if not allowed, an error message is fed back (see 1004).

On the other hand, at step 906 of FIG. 9, the packet identification section 12 extracts a header. Then, the control proceeds to step 907.

At step 907, the session supervising section allocates a "flow_ID" to the main signal packet. That is, a source IP address "SA_IP" and a session number "session_ID" are extracted from the header (see 9071). Then, the session table is retrieved by using the "SA_IP" and "session_ID" (see 9072). Note that a data region of the packet is stored in a standby buffer of the intermediate frame forming section 13. Then, it is determined whether or not "flow_ID" is registered in the session table (see 9073). As a result, if "flow_ID" is registered in the session table, this "flow_ID" is obtained, so that the packet is treated as a QoS session (see 9074). On the other hand, if "flow_ID" is not registered in the session table, "flow_ID" (=all "0") is allocated so that the packet is treated as a No-QoS session (see 9075). After that, the obtained or allocated "flow_ID" is transmitted to the intermediate frame forming section 13 (see 9076 and 9077). Note that intermediate frames formed by the data packet are stored in the queue 23a grouped for the sessions and the read operation thereof is controlled by the output scheduler 23b.

Figure 11:
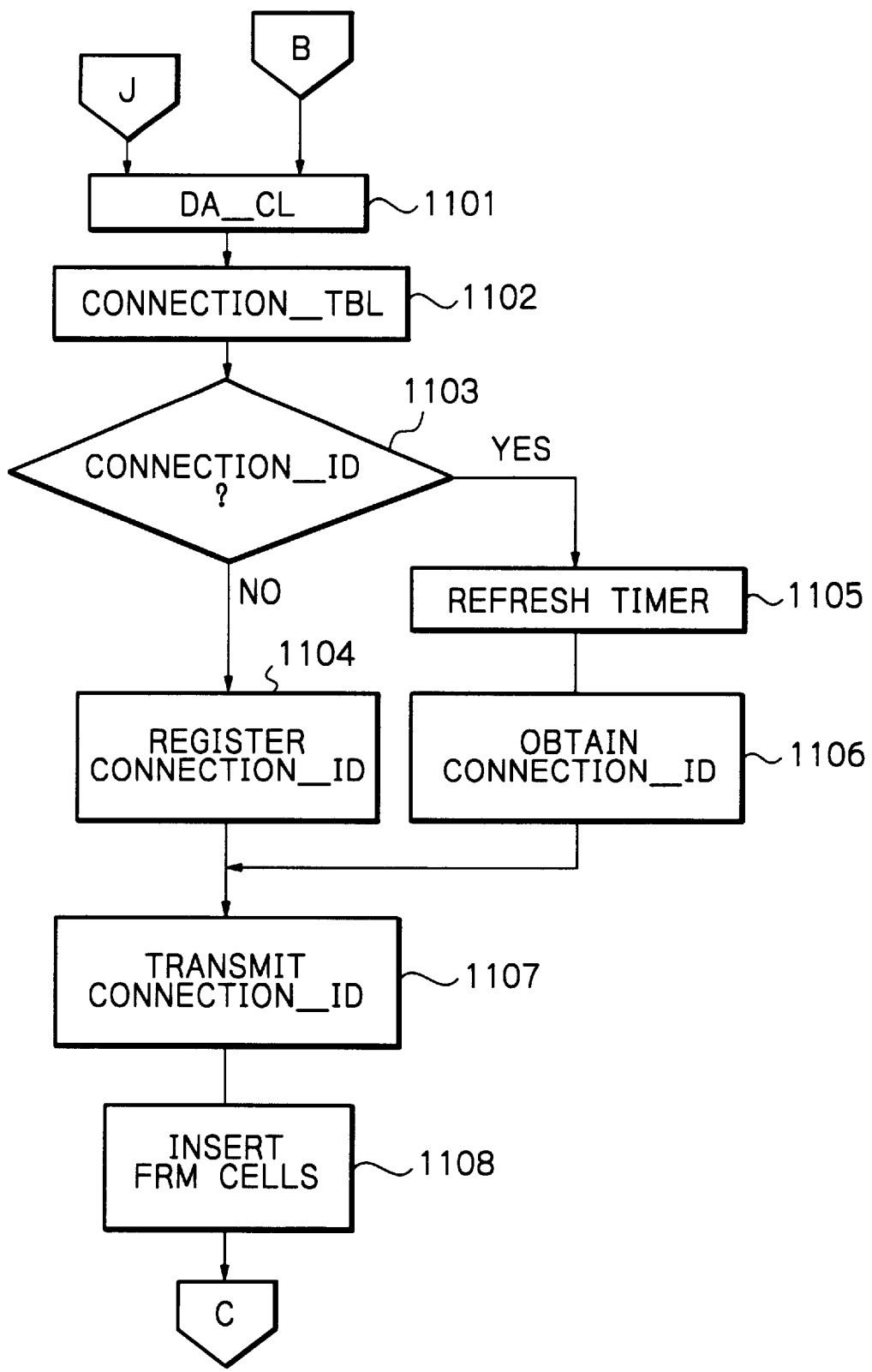

When the data packet is a No-QoS session, the connection supervising section 21 carries out an operation as shown in FIG. 11. That is, "DA_CL" is extracted from the header of the intermediate frame (see 1101). Then, a connection supervising table is retrieved by using "DA_CL" in the intermediate frame as a key (see 1102). Then, it is determined whether or not there is a "connection_ID" entry in the connection table (see 1103). If there is no "connection_ID" in the connection table, a new "connection_ID" is registered in the connection table (see 1104). On the other hand, if there is a "connection_ID" entry in the connection table, a clean-up timer is refreshed (see 1105), and then the "connection_ID" is obtained (see 1106). Then, the buffer supervising section 18 transmits the registered or obtained "connection_ID" to the output scheduler section 23b (see 1107). Also, the connection supervising section 21 operates the FRM cell insertion section 22 to periodically insert FRM cells into active connections, thus monitoring the congestion states thereof (see 1108).

Figure 12:
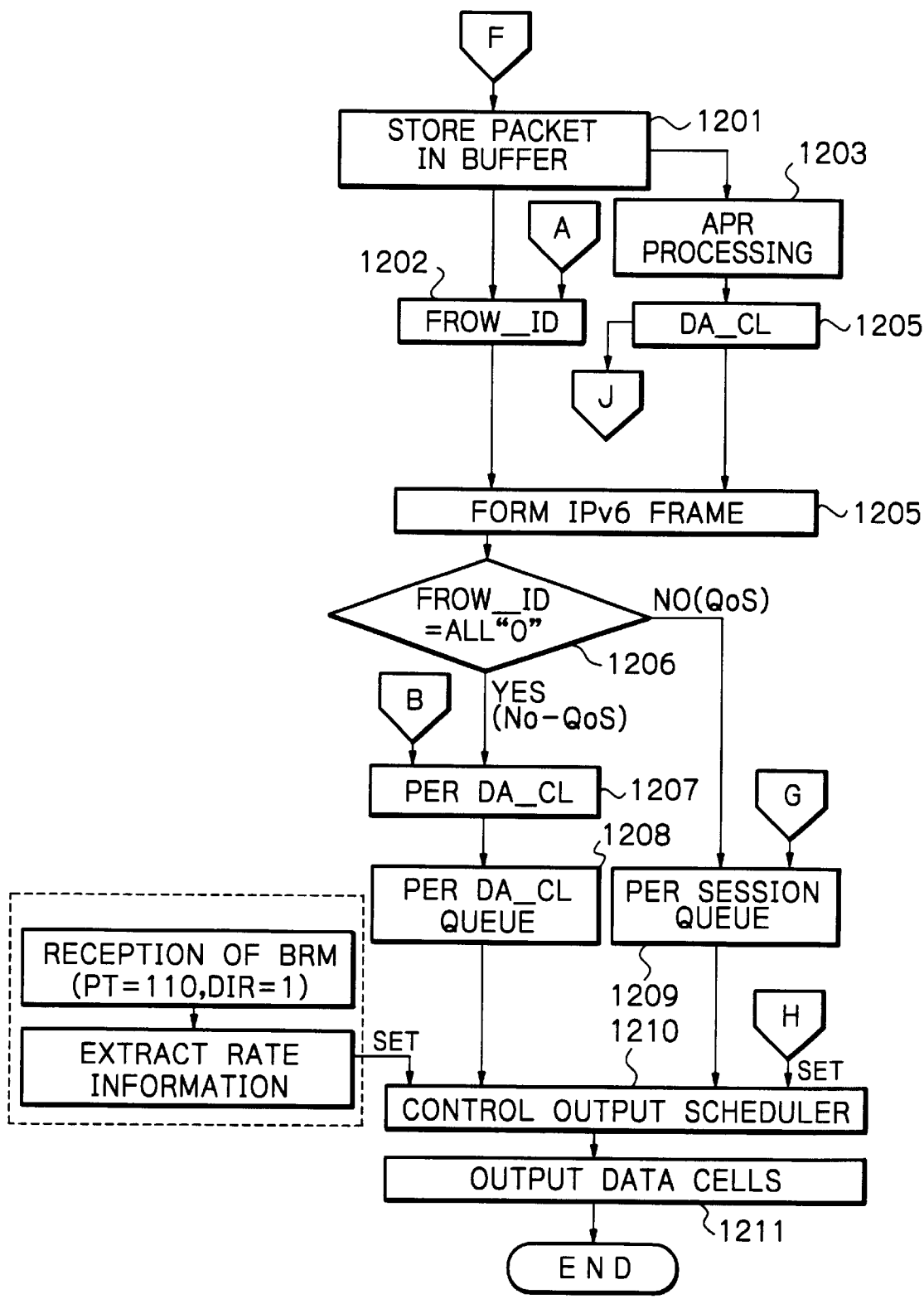

Also, at step 902 of FIG. 9, if the IPv4 packet is a main signal packet, an operation as shown in FIG. 12 is carried out. That is, the main signal packet is stored in the buffer of the intermediate frame forming section 13. Then, a "flow_ID" is obtained (see 1202), while an ARP processing is carried out (see 1203) and a destination IWU address "DA_CL" is obtained (see 1204). Then, an intermediate frame (IPv6) is formed (see 1205). Then, it is determined whether "flow_ID" is all "0" (see 1206). If "flow_ID" is all "0", i.e., a No-QOS session, ATM cells are stored in the queue 23a-1. On the other hand, if "flow_ID" is not all "0", i.e., a QoS session, ATM cells are stored in the queue 23a-2 (see 1208). Then, the output scheduler 23b is controlled in accordance with the rate information extracted from the BRM cells received by the BRM cells detecting section 27 (see 1210), and thus, the ATM cells is transmitted to the CL network 1.

As explained hereinabove, according to the present invention, connection supervising in a connectionless network can be carried out without ATM standard connection realizing means. That is, a straightforward type high speed connection supervising can be carried out without an overhead processing such as explicit connection set-up/tear-down procedure of ATM standard. Also, in a data transfer network having different forward/backward paths, the same path supervising for the paths can be carried out, and thus, the connection supervising according to the present invention can be used in supervising buffers in flow control of a rate base and feedback transfers of RM cells. Further, since best effort connections are aggregated in inter-IWU connections, the number of supervised connections can be reduced, thus smoothly controlling the buffers with the IWUs. Furthermore, session supervising of multipoint-to-multipoint communication, to which the coming IP communication service such as RSVP is intended, is possible. For this purpose, in a network where QoS sessions and No-QOS sessions are mixed, a transfer processing suitable for each session can be carried out, so that the session supervising according to the present invention can be applied to "RSVP over ATM".

What is claimed is:

1. An ATM connectionless communication system for delivering connectionless datagram in a form of sessions through an ATM network, comprising:

edge units, each connected to a user network where quality-of-service (QoS) sessions and No-QoS sessions are mixed, for accommodating an IPv4 packet from said user network into an intermediate frame and accommodating said intermediate frame into ATM cells; and core units for transmitting said sessions through said ATM network, said edge units and said core units being connected by permanent virtual paths to form a connectionless network, each of said edge units having a session supervising means for determining whether said IPv4 packet is a QoS session or a No-QoS session, and means for allocating a control flow number to said IPv4 packet when said IPv4 packet is a QoS session.

2. The system as set forth in claim 1, wherein each of said edge units comprises an interworking unit (IWU), and each of said core units comprises a connectionless/crossconnect (CL-XC) unit.

3. The system as set forth in claim 1, wherein each of said edge units further comprises a connection supervising means for specifying said No-QoS sessions by source IP addresses and destination IP addresses and aggregating said No-QoS sessions for every destination number of said edge units when said IPv4 packet is a No-QoS session.

4. The system as set forth in claim 3, wherein each of said edge units further comprises:

means for maintaining a correspondence between said source IP addresses and session numbers;

means for operating said connection supervising means in accordance with a session number accommodated in said intermediate frame.

5. The system as set forth in claim 1, wherein each of said edge units comprises:

buffers each for every destination edge unit;

a resource management cell insertion section for periodically inserting resource management cells into output cells of said buffers;

each of said core units comprising resource management cell transmitting means for writing congestion information into said resource management cells, each of said edge units comprising means for controlling cell transmission of said buffers in accordance with the congestion information written into said resource management cells.

6. The system as set forth in claim 1, wherein a header of said intermediate frame includes a source edge unit number, a destination edge unit number and said control flow number, said header being entirely accommodated in a leader cell of said ATM cells.

* * * * *